Dec. 29, 1936.  P. M. THAYER  2,065,836
METHOD AND APPARATUS FOR FILTERING SEWAGE
Filed May 27, 1936   2 Sheets-Sheet 1
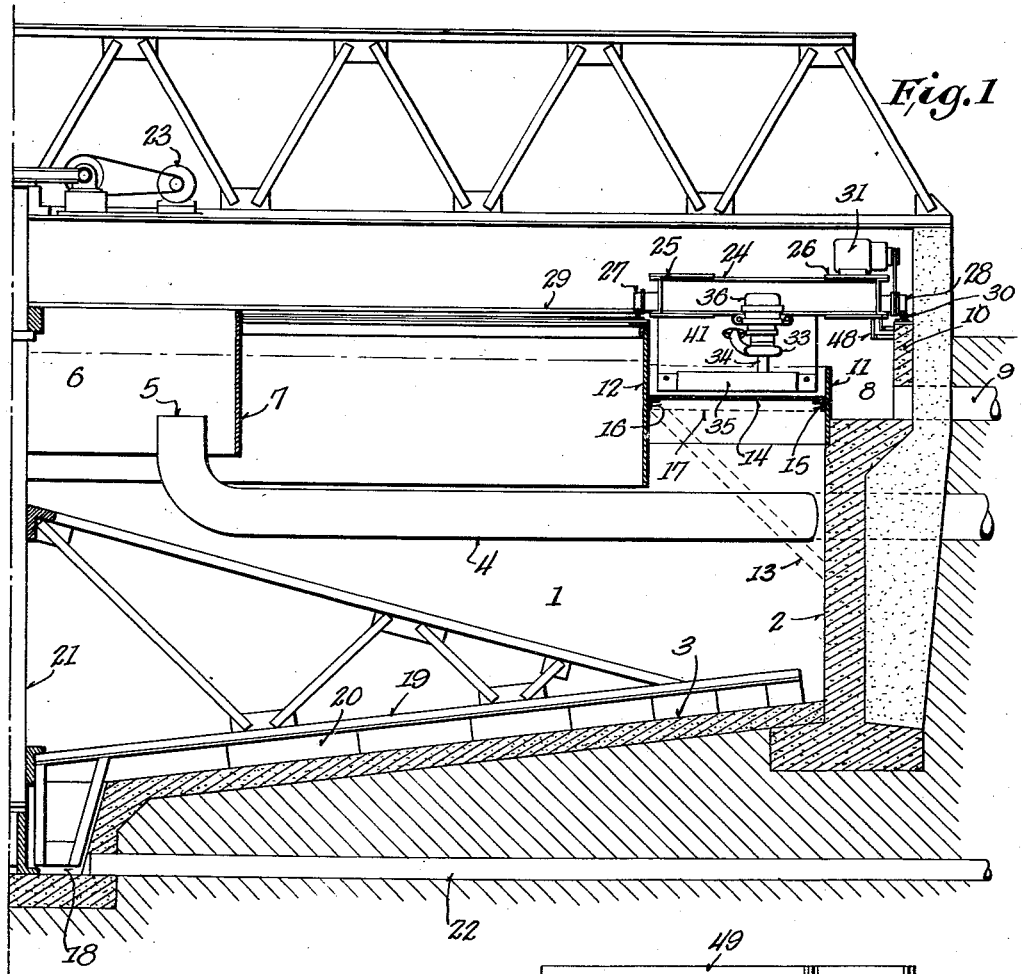
Fig.1
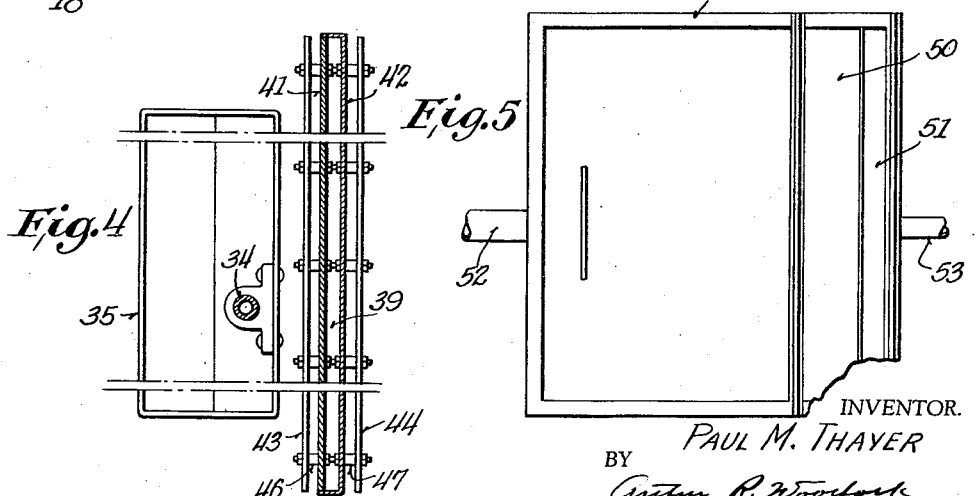
Fig.4
Fig.5
INVENTOR.
PAUL M. THAYER
BY
ATTORNEY.

Dec. 29, 1936.  P. M. THAYER  2,065,836
METHOD AND APPARATUS FOR FILTERING SEWAGE
Filed May 27, 1936  2 Sheets-Sheet 2
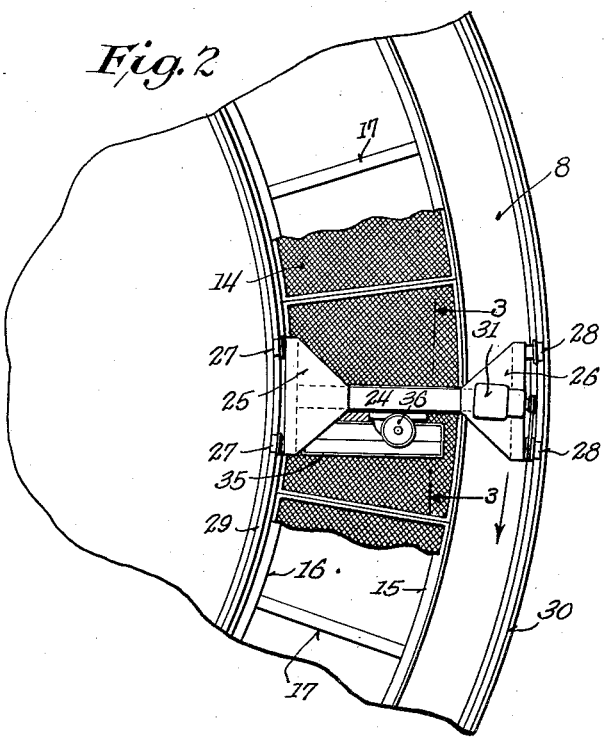
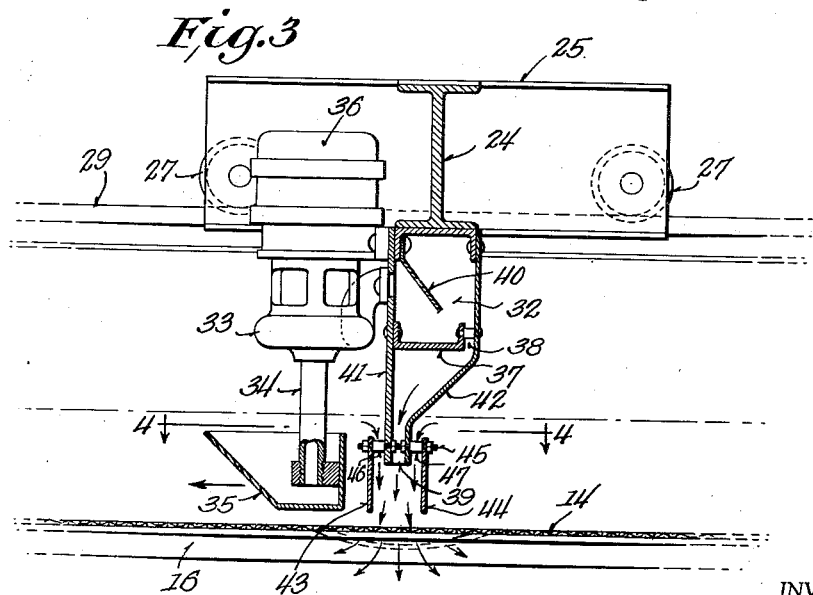
INVENTOR.
PAUL M. THAYER
BY
ATTORNEY.

Patented Dec. 29, 1936

REISSUED
DEC 3 1940

2,065,836

UNITED STATES PATENT OFFICE 2,065,836

METHOD AND APPARATUS FOR FILTERING SEWAGE

Paul M. Thayer, Milwaukee, Wis.

Application May 27, 1936, Serial No. 81,977

9 Claims. (Cl. 210—44)

This invention relates to a method and apparatus for filtering sewage.

Though the invention is not confined to a continuous process or an apparatus for continuous filtering of sewage, it is nevertheless eminently adapted for such operation, and an object of this invention, therefore, is to provide a method and an apparatus for the continuous filtration of sewage.

In filtering sewage various means have been employed, such as providing a settling tank and filtering means through which the sewage passes, and attempts have been made to clean the filtering means while the apparatus is in operation, but these attempts have not proven wholly satisfactory for several reasons among which may be mentioned the fact that during this cleaning operation a considerable quantity of dirty liquid passes into the clear liquid stream and also a large percent of the filtering material is lost and the device rendered less effective as its time of use increases.

Also difficulty has been experienced due to the fact that a very large amount of power is consumed in these cleaning operations in certain forms of the heretofore known types of sewage filter cleaning means.

Further objects of this invention are to provide an apparatus for filtering sewage which overcomes the above noted defects, which is so made that it will continuously filter the sewage and also, if desired, continuously clean the filtering means without causing the dirty liquid to flow outwardly with the clear liquid but confining the dirty liquid to the settling tank and preventing its outward flow with the clear liquid, and in which the cleaning action may be intermittent if desired or may go on continuously and may take place progressively, that is to say, the cleaning means may progress along the filtering means and may confine its zone of operation to a restricted area thereof, leaving the major portion of the filtering means undisturbed and active for the continuous operation of the filtering apparatus.

A particular object of this invention is to provide a novel apparatus and a novel method of sewage filtration which contemplates the provision of a settling tank with a settling zone at a point remote from the filtering means, the sewage rising upwardly through the filtering means and passing off therefrom as a clear liquid, and at the same time to provide for the progressive cleaning of the filtering means by causing a down flow of a low velocity high volume stream of clear liquid, confining the cleaning action to a limited progressing zone of the filtering means, and confining the disturbance and agitation of the sewage below the filtering means to a very small area far remote from the sedimentation zone so that the settling action of the sewage is not in the least interfered with and so that the normal operation of the apparatus is undisturbed, thereby permitting the continuous operation of the machine while the cleaning action is taking place.

In greater detail, objects of this invention are to provide a sewage filtering apparatus in which a settling tank is provided with a sedimentation zone in the lower portion thereof, in which filtering means are provided at a convenient point in the tank, for instance adjacent the margin or margins thereof, in which by means of a differential level or pressure the sewage passes upwardly through the filtering means, in which even the very fine solid material, such as the colloidal material, may adhere to the under side of the filtering means and may form clusters or groups or aggregates whose mass is constantly augmented by oncoming minute or colloidal solids until finally these clusters either break away and drop of their own weight or are dislodged by the cleaning means and settle to the bottom of the tank without getting the opportunity, even during cleaning, of passing upwardly through the filtering means, and to provide a cleaning apparatus which utilizes only the clear liquid above the filtering means and passes this clear liquid down at a low velocity and high volume.

Further objects are to provide a cleaning device for a sewage filter which is adapted to travel continuously along and above the filtering means, which draws clear liquid from above the filtering means and discharges it downwardly, preferably entraining a large volume of other clear liquid so that a low velocity high volume stream of liquid is passed downwardly through the filtering means, thereby dislodging adhering solids from the under side of the filtering means.

Further objects are to provide a cleaning device for a sewage filter in which the filtering means, if desired, may be made sufficiently flexible so that it is slightly bowed downwardly or manipulated during the cleaning operation and by the downwardly flowing large volume of clear liquid, thus assisting in dislodging adhering materials and removing any materials that may be held in the interstices of the filtering means.

Further objects are to provide a novel form of cleaning means for the filtering means of a sewage filter which is so made that it is self-propelled or power driven and is power operated to skim or draw clear liquid from the upper portion of the clear liquid above the filtering means and pump or force it downwardly with a relatively low velocity and high volume through the filtering means, and in which the apparatus is so made that the discharge may be adjusted both as to velocity and volume.

Further objects are to provide a filtering apparatus for sewage which may be made very cheaply, in which the parts which are likely to become worn during use may be cheaply and readily replaced, and in which the initial installation may be made at a comparatively small cost.

Embodiments of the invention are shown in the accompanying drawings, in which:

Figure 1 is a fragmentary vertical sectional view of a sewage filtering apparatus.

Figure 2 is a fragmentary plan view of a portion of the filtering means, with parts broken away, showing the cleaning apparatus in position.

Figure 3 is a vertical elevation, partly in section and with parts broken away, showing the cleaning device, such view corresponding to a section on the line 3—3 of Figure 2.

Figure 4 is a sectional view on the line 4—4 of Figure 3.

Figure 5 shows a modified form of the device.

Referring to the drawings, it will be seen that a settling tank 1 has been provided which may be formed in any desired shape, for example circular, and may be provided with concrete side walls 2 and a concrete bottom 3. The incoming sewage may be delivered through an inlet pipe or pipes 4 which has an upwardly turned end 5 for discharging the sewage into a stilling well 6 defined by an annular downwardly extending baffle 7. A clear liquid launder 8 may receive the discharged clear liquid and a suitable pipe or pipes 9 may be provided for carrying off the clear filtered liquid. The clear liquid launder 8 or clear liquid receiving channel may be formed between an upstanding outer wall 10 of the main concrete side walls and an inner weir or overflow baffle 11 which may be formed, if desired, of sheet metal. An annular wall 12 may be provided and may also be formed of sheet metal and preferably extends downwardly to a point below the lower edge of the stilling well wall 7, as shown in Figure 1. Suitable brackets 13 may be provided at intervals to support the member 12.

The filtering means is indicated at 14 and may be a cloth or wire screen, as shown in Figure 2, and is preferably formed of removable sections. This filtering means is carried in any suitable way, as for example upon the annular angle irons 15 and 16. Additional stiffness for the structure may be afforded by providing transverse struts 17, see Figure 2, at regular intervals.

The lower portion of the settling tank 1 constitutes a sedimentation zone and preferably the bottom 3 thereof is slanted inwardly to a centrally located sump 18. If desired, a power driven scraper consisting of a spider frame 19 with scrapers 20 may be carried in any suitable manner, as from a centrally located shaft 21, and is designed to scrape the sediment or sludge at the bottom of the tank and cause it to gradually pass into the sump 18, from which it is withdrawn or discharged by means of the sludge pipe 22. Any suitable means, for example the motor 23, see Figure 1, and suitable reduction mechanism may be provided for driving the sludge scraper.

The settling tank provides a large, quiet area for the gradual settling of the solid material downwardly from the sewage. However, there is a quantity of solid material that is suspended in the liquid and as the liquid passes upwardly, this suspended solid material, even if of colloidal form, is arrested or clings to the lower side of the filtering means 14 and the clarified or clear liquid flows upwardly through the filtering means and overflows into the clear liquid launder or discharge channel 8.

It has been found that even if the suspended material is of colloidal form, that it will adhere to the screen or filtering means and will form clusters or aggregates of gradually increasing size which will, either by their own weight or from the cleaning means hereinafter described, dislodge and fall from the under side of the filtering means and settle to the bottom of the tank.

In order to prevent clogging of the filtering means and to provide for the ready cleaning thereof and the continuous uninterrupted operation of the sewage filter, a novel form of cleaning means has been provided which is so made that it does not cause agitation in the sedimentation zone, but in which the washing or cleaning of the filtering means is confined to a very small section or zone closely adjacent the filtering means and extends downwardly beyond the filtering means only a very limited distance, the sedimentation zone being remote or spaced a great distance downwardly therefrom so that there is no interference in the settling out of the solid material during the cleaning or washing of the filtering means.

The washing device may include a framework or body portion formed of a central I-beam or other structural member 24 provided with inner and outer end portions 25 and 26. These end portions are equipped with pairs of rollers 27 and 28, see Figures 1 and 2, which respectively ride upon inner and outer annular tracks 29 and 30. Power means, such as an electric motor 31, is provided and is conveniently carried on the outer member 26 and belted to one of the outer wheels 28 so as to propel the cleaning device around the tank.

A box like header 32, see Figure 3, is provided and receives the clear liquid from the discharge side of a rotary pump 33 whose intake pipe 34 extends downwardly into a skimming member or scoop 35. If desired, the scoop or skimming member 35, which is of rectangular boxlike shape, may be supported from the intake pipe 34 of the pump 33. An electric motor 36 may be directly coupled to the pump, as indicated in Figure 3, and the motor, pump and header 32 may be supported from the travelling carriage structure.

The lower portion of the header 32 is only partially closed by means of the bottom plate 37, a slot 38 being provided between a marginal edge of the channellike bottom plate 37 and the adjacent wall of the header 32. This bottom plate 37 in reality constitutes a spreader plate to secure a uniform flow of the liquid downwardly through the nozzle portion 39 of the device, a baffle 40 being preferably provided within the header to assist in securing a distributed and uniform flow of liquid downwardly from the header.

The nozzle portion 39 is formed by extending the inner wall 41 of the header downwardly and by extending the outer wall 42 thereof downwardly and preferably on a slant towards the inner wall 41. In forming the device, it is preferable to make the wall 42 of lighter material than the wall 41 so that it may be flexed to increase or decrease the size or width of the nozzle 39.

The nozzle 39 supports a forward and a rear plate 43 and 44 and these plates, as well as the nozzle, extend transversely across the filtering means, as shown most clearly in Figures 1, 2 and 3. Any suitable means may be provided for adjustably holding the nozzle and the plates. For example, a plurality of bolts 45 may be positioned at regular intervals and passed through the nozzle and the plates 43 and 44. Spacers 46 are provided between the plate 43 and the wall 41 and spacers 47 are provided between the plate 44 and the lower or nozzle portion of the wall 42. Nuts are carried by the bolts 45, as shown, and bear against the plates 43 and 44 and the walls 41 and 42.

It is obvious that the opening or width of the slot of the nozzle 39 may be varied by backing the nuts bearing against the wall 42 and the plate 44 outwardly to increase the size of the nozzle, or moving them inwardly to decrease the size of the nozzle. Also the size of the spacers 47 or the size of both the groups of spacers 46 and 47 may be varied to vary the spacing of the plates 43 and 44 from the nozzle.

It will be observed from an examination of Figure 3, that the nozzle and plates 43 and 44 constitute an injector so that the downwardly projected stream of liquid from the nozzle entrains a large volume of liquid between the plates 43 and 44 and projects this large volume low velocity stream of liquid downwardly against and through the filtering means or screen 14, thus cleaning the screen and dislodging adhering material from the screen. As indicated by the arrows in Figure 3, the disturbance or agitation is confined to a very limited or restricted area immediately adjacent and below the screen and this disturbed area is far remote from the sedimentation zone and is confined at any instant to a limited area of the filtering means or screen. Consequently there is no interference whatsoever to the free and undisturbed settling of solid material or to the continuous operation of the filter as by far the major portion of the screen section is wholly clear and free of the cleaning device.

As the cleaning device progresses forwardly in the direction of the arrow, see Figure 3, the clear liquid is scooped up or drawn into the scoop or skimmer 35 from adjacent the top surface of the clear liquid, the liquid level above the filtering means being indicated in Figure 3, and the low velocity large volume stream of clear liquid is projected downwardly through the screen. The device progresses forwardly continuously around the filter and thereby continuously cleans the screen without interfering with the continuous operation of the sewage filter.

It is to be noted, as indicated in Figure 3, that the screen may be sufficiently flexible so that it will be slightly bowed or distorted downwardly, as shown in dotted lines in such figure, while it is acted upon by the low velocity large volume stream of clear liquid and consequently this working or motion of the screen while the clear liquid is passing through the bowed section will assist in dislodging any adhering material that may either cling to the under side of the screen or have found its way into the interstices of the screen.

The electric motors 31 and 36, see Figure 1, may be supplied with current from rails 48, as shown, or any other suitable means to provide power for the motors carried on the travelling cleaning device.

It will be seen that there is no possibility of the discharge of unfiltered sewage along with the clear liquid during the washing operation and it will be seen further that the washing operation may be either continuous or intermittent as desired.

Obviously the invention is not confined to a circular tank but may be employed where the settling tank is of rectangular or other shapes. For example, as indicated in Figure 5, a rectangular tank 49 may be provided, the filtering section being indicated at 50 and the clear liquid launder at 51, the inlet and outlet pipes being indicated at 52 and 53. The washing device is not shown in this view but is adapted to travel back and forth over the filtering zone 50, as is apparent from the preceding description.

It will be seen that a novel sewage filtering apparatus and a novel method of filtering and cleaning has been provided by this invention whereby a continuous operation of the filtering apparatus may be had and at the same time either continuous or intermittent cleaning of the filtering means or screen may be secured by a power driven automatic cleaning apparatus without in any way disturbing the gradual settling of the solid material normally taking place in the settling tank of the filter.

It will be seen further that the device may be constructed very cheaply and that a very inexpensive filtering means may be used, either cloth or wire screen, or any other suitable material, and that means are provided which preclude the clogging of the filtering means.

It will be seen further that the initial cost of the filtering apparatus is relatively small and that the cost of operation of the cleaning device is negligible as two relatively small motors are all that is required to operate the cleaning apparatus for the filtering means. Consequently the consumption of power is extremely small for the cleaning operation.

Although this invention has been described in considerable detail, it is to be understood that such description is intended as illustrative rather than limiting, as the invention may be variously embodied and is to be interpreted as claimed.

I claim:

1. A filtering device having a main settling chamber and having an overflow weir and having a zone of filtering material suspended horizontally within the settling chamber adjacent the weir and through which the liquid to be filtered is adapted to pass in an upward direction, washing means movable along the filtering material and including power means for forcing liquid through the filtering material in the reverse direction from that normally travelled by said liquid, said washing means operating on successive sections of the filtering material and allowing continuous and uninterrupted operation of the filtering device, the solid removed material dislodged from the bottom of the filtering material falling back into the settling chamber.

2. A filtering device having a main settling chamber and having an overflow weir and having a zone of filtering material located horizontally within the settling chamber adjacent the weir and through which the liquid to be filtered is adapted to pass in an upward direction, washing means located above and movable along the filtering material and including power means for drawing clear liquid from the zone above the filtering material and for forcing such liquid through the filtering material in the reverse direction from that normally travelled by said liquid, said washing means operating on successive sections of the filtering material and allowing continuous and uninterrupted operation of the filtering device, the solid removed material dislodged from the bottom of the filtering material falling back into the settling chamber.

3. A filtering device having a main settling chamber and having a zone of filtering material suspended horizontally within the settling chamber and through which the liquid to be filtered is adapted to pass in an upward direction, means for temporarily collecting clear liquid after it has passed upwardly through the filtering material, washing means movable along the filtering material and including power means having an intake for the clear liquid, said washing means forcing the clear liquid through the filtering material in the reverse direction from that normally travelled by said liquid, said washing means operating on successive sections of the filtering material, the solid removed material dislodged from the bottom of the filtering material falling back into the settling chamber.

4. A filtering device having a main settling chamber and having an overflow weir and having a zone of filtering material suspended horizontally within the settling chamber adjacent the overflow weir and through which the liquid to be filtered is adapted to pass in an upward direction, washing means located above and movable along the filtering material and including power means for drawing clear liquid from above the filtering material and for forcing the said clear liquid downwardly through the filtering material, said washing means including means for entraining additional clear liquid from above the filtering material adjacent the discharge portion of said washing means to produce a large volume low velocity downwardly projected stream of clear liquid through said filtering material, said washing means operating on successive sections of the filtering material and allowing continuous and uninterrupted operation of the filtering device, whereby any agitation below the filtering material is confined to a shallow zone located closely adjacent the lower side of the filtering material, the solid removed material dislodged from the bottom of the filtering material falling back into the settling chamber.

5. A filtering device having a main settling chamber and having an overflow weir and having a zone of filtering material suspended within the settling chamber adjacent the overflow weir and through which the liquid to be filtered is adapted to pass to said overflow weir, washing means movable along the filtering material and including power means for drawing clear liquid from the overflow side of the filtering material and for forcing the said clear liquid through the filtering material in the reverse direction to the normal flow through the filtering material, said washing means producing a large volume low velocity stream of clear liquid through said filtering material, said washing means operating on successive sections of the filtering material and allowing continuous and uninterrupted operation of the filtering device, whereby any agitation on the inner side of the filtering material is confined to a small zone located closely adjacent the inner side of the filtering material, the solid removed material dislodged from the filtering material passing immediately from the small agitated zone into an extensive quiet zone.

6. A washing means for washing the filtering material of a filter while said filter is in operation, said washing means comprising power driven means for drawing clear liquid from one side of the filtering material and for forcing clear liquid through the filtering material towards the other side of the filtering material, said washing means having a discharge portion located adjacent the filtering material and having an injector carried adjacent the discharge portion of the washing means, said injector having an intake for clear liquid located at a point spaced from the filtering material.

7. A washing means for washing the filtering material of a filter while said filter is in operation, said washing means comprising power driven means for drawing clear liquid from one side of the filtering material and for forcing clear liquid through the filtering material towards the other side of the filtering material, said washing means having a discharge portion located adjacent the filtering material and having an injector carried adjacent the discharge portion of the washing means, said injector having an intake for clear liquid located at a point spaced from the filtering material and having an intake for entraining liquid, said injector having an adjustable member to vary the intake opening for the entrained liquid.

8. Washing means for a filter having extended filtering means, said washing means comprising power driven means for drawing clear liquid from one side of said filtering means and for forcing clear liquid through the filtering means to the other side thereof, said washing means having the intake portion thereof provided with a skimmer having an open portion directed away from the filtering means and having a discharge portion located adjacent the filtering means, and an injector located adjacent the discharge portion of said washing means for entraining additional clear liquid, said injector having its inlet portion located at a point spaced from said filtering means.

9. The method of continuously filtering sewage comprising passing sewage upwardly through a filtering means, allowing the solid material in the sewage to settle at a material distance below the point of filtration, discharging the clarified liquid from the upper side of the filtering means and progressively operating on successive sections of the filtering means by passing a low velocity relatively high volume flow of the filtered liquid downwardly through the filtering means to dislodge adhering material from the under side of the filtering means without causing agitation of the sedimentation.

PAUL M. THAYER.